(12) United States Patent
Keller

(10) Patent No.: US 7,267,032 B1
(45) Date of Patent: Sep. 11, 2007

(54) MULTI-OFFSET DRIVER TOOL

(75) Inventor: Stefan Keller, Sudeetendeutsche Str. 36, D-80937 München (DE)

(73) Assignees: Stefan Keller, Munich (DE); Stephen J. Slater, Williamsville, NY (US)

( * ) Notice: Subject to any disclaimer, the term of this patent is extended or adjusted under 35 U.S.C. 154(b) by 0 days.

(21) Appl. No.: 11/124,416

(22) Filed: May 6, 2005

Related U.S. Application Data

(60) Provisional application No. 60/569,393, filed on May 7, 2004.

(51) Int. Cl.
  *B25B 13/00* (2006.01)
  *B25B 21/00* (2006.01)
  *B25B 23/16* (2006.01)
(52) U.S. Cl. .................. 81/52; 81/35; 81/73; 81/436
(58) Field of Classification Search .................. 881/35, 881/52, 73, 436
See application file for complete search history.

(56) References Cited

U.S. PATENT DOCUMENTS

| | | | | |
|---|---|---|---|---|
| 1,026,659 A | * | 5/1912 | Clark | 81/35 |
| 1,398,234 A | * | 11/1921 | Landis | 81/450 |
| 1,446,988 A | * | 2/1923 | Osburn | 81/124.4 |
| 3,343,434 A | * | 9/1967 | Schroeder | 81/60 |
| 4,517,862 A | * | 5/1985 | Garcia | 81/119 |

FOREIGN PATENT DOCUMENTS

DE  3905633  8/1990

* cited by examiner

*Primary Examiner*—Joseph J. Hall, III
*Assistant Examiner*—Shantese McDonald
(74) *Attorney, Agent, or Firm*—Simpson & Simpson, PLLC

(57) ABSTRACT

A fastener driving tool. At least one offset driven part is detachably attachable to an input part for accessing a fastener for driving thereof.

3 Claims, 3 Drawing Sheets

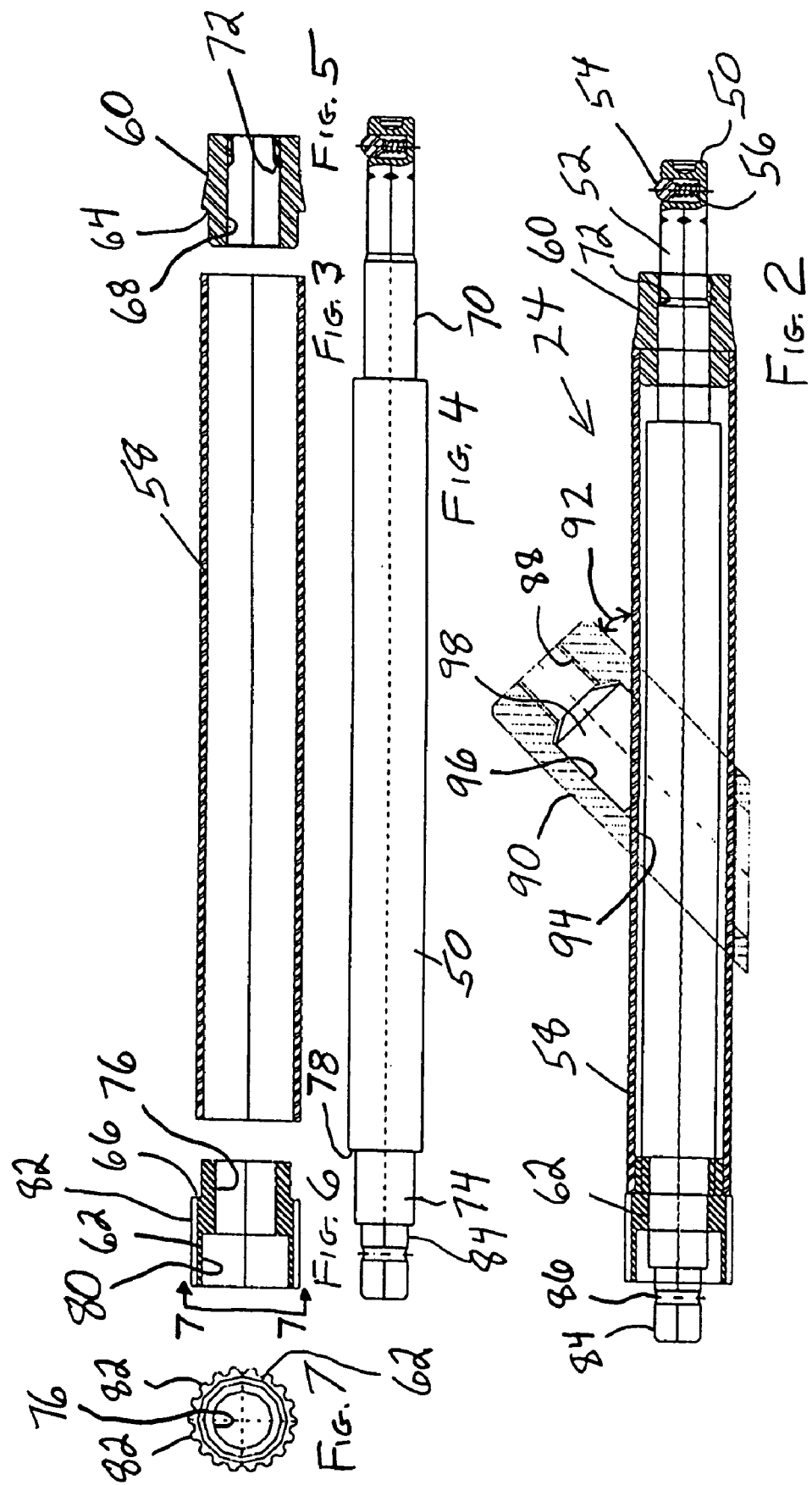

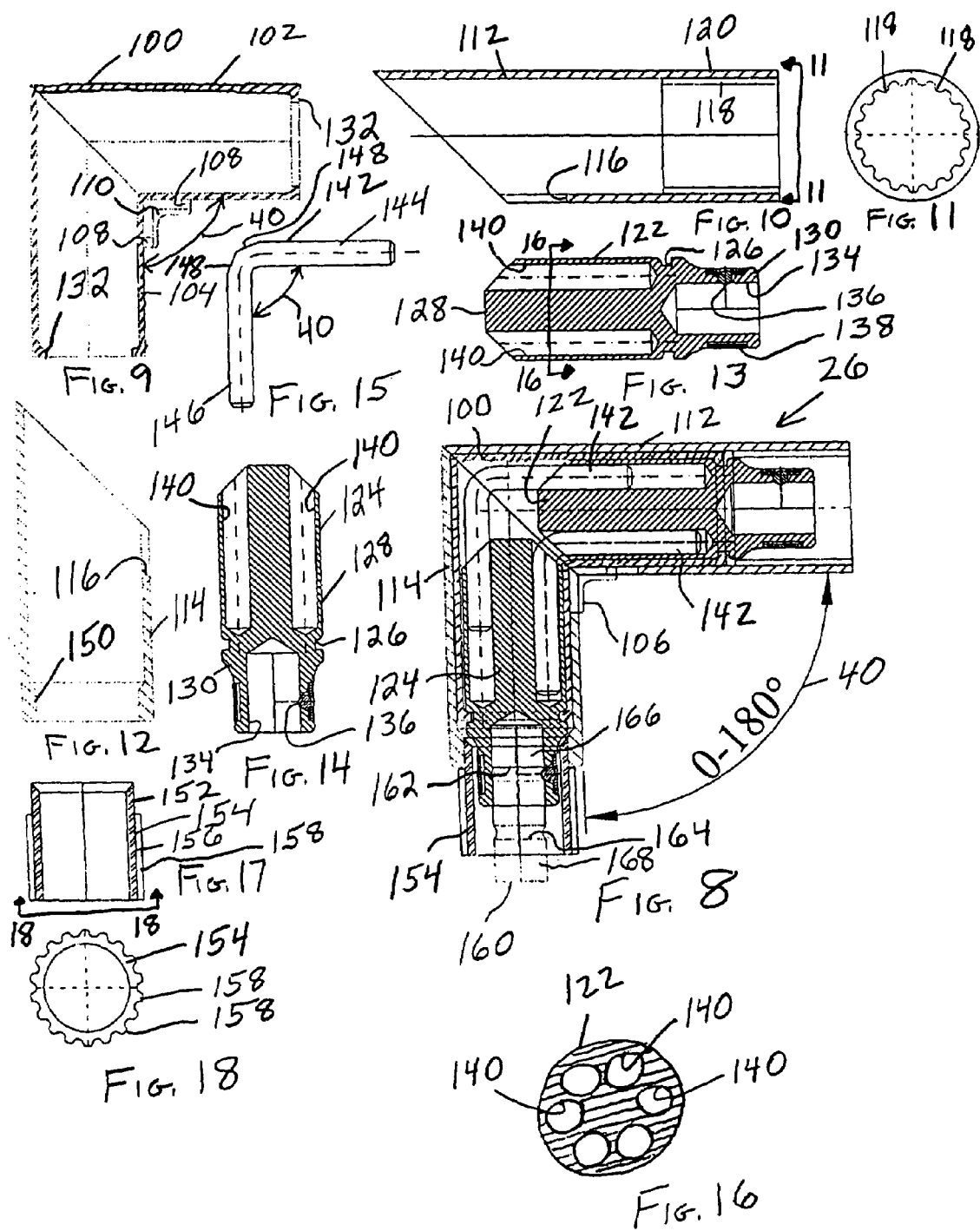

MULTI-OFFSET DRIVER TOOL

Priority of U.S. provisional application No. 60/569,393, filed May 7, 2004, the disclosure of which is hereby incorporated herein by reference, is hereby claimed.

The present invention relates generally to tools. Examples of tools to which the present invention is directed include drilling, sinking, threading, and fastener driving tools such as, for example, screwdrivers, drill bit holders, and socket wrenches. More particularly, the present invention relates to offset tools, i.e., tools wherein the direction to which rotary motion is applied to drive (tighten, loosen, etc.) fasteners is changed in order to access fasteners in difficult to reach places.

Offset screwdrivers typically have bevel gearing or other direct toothed gearing to achieve the offset wherein only one pair of teeth serves to transmit the torque. Such gearing undesirably allow very small torques or, when larger bevel-gear modules are used, are so voluminous at the articulation point that they are no longer usable in confined and difficult places. Offset screwdrivers also typically have counter-handles for positioning of thereof and for applying pressure to the fastener.

Spectools of West Bridgewater, Mass. sells offset tools including a screwdriver kit providing combinations of straight and offset drivers for use manually or with a battery operated driver (see www.spectools.com, for example, tool no. WPK-2603). The gear sets in the Spectools offset screwdrivers are also disadvantageously very large.

Offset screwdrivers and other offset tools have been provided for many years by Pontex Consulting & Trading GmbH of Munchen, Germany. Their German patent DE3905633, which is hereby incorporated herein by reference, discloses such an offset screwdriver wherein, for the transmission of forces or torque, not only one pair of teeth, but always a multiplicity of hardened cylindrical pins in the form of a closed bundle are continuously in full engagement over the entire rotation. Such an offset screwdriver allows angling up to 90 degrees with very small external dimensions and allows transmission of considerably greater torques than comparable bevel-gear pairings.

The torque transmission mechanism at the articulation point of the offset screwdriver of the above patent is not only unduly complex but is still disadvantageously larger than desired.

For various fastener driving applications in various hard to reach places, the offset angle required may vary from 30 to 60 to 90 to 150 degrees to some angle inbetween. The above offset tools disadvantageously require that a separate tool be provided for each offset angle, thus requiring a customer to purchase several such tools for different applications he or she may encounter.

It is accordingly an object of the present invention to provide a tool which has a universal driver for a variety of offset angles for driving fasteners in hard to reach places.

It is a further object of the present invention to provide an offset tool for driving fasteners wherein the torque transmission mechanism at the articulation point is compact so that the tool is easily usable in difficult to reach places and wherein adequate torque is provided to easily and firmly tighten and loosen the fasteners.

It is another object of the present invention to provide such an offset tool which is rugged, reliable, simple in construction, and which is easily usable.

In order to provide a tool which has a universal driver for a variety of offset angles for driving fasteners in hard to reach places, in accordance with the present invention, the tool has an input part and at least one offset driven part detachably attachable to the input part for accessing a fastener for driving thereof. The input and driven parts may be parts of a tool kit containing input parts of different lengths and a plurality of driven parts providing a plurality of offsets at different angles for connection in tandem.

In order to provide an offset tool for driving fasteners wherein the torque transmission mechanism at the articulation point is both simple in construction for ruggedness and reliability and compact so that the tool is easily usable in difficult to reach places and wherein adequate torque is provided to easily and firmly tighten and loosen fasteners, in accordance with the present invention, offsetting shafts of the driven part are connected only by pins (i.e., without any gearing).

The above and other objects, features, and advantages of the present invention will be apparent in the following detailed description of the preferred embodiment thereof when read in conjunction with the accompanying drawings wherein the same reference numerals denote the same or similar parts throughout the several views.

BRIEF DESCRIPTION OF THE DRAWINGS

FIG. 2 is a sectional view of the input part thereof, with the shaft therefor shown partly in side view and partly in section.

FIG. 3 is a sectional view of the housing for the input part.

FIG. 4 is a side view, partly in section, of the shaft for the input part.

FIGS. 5 and 6 are sectional views of bearings at opposite ends of the housing for the shaft.

FIG. 7 is an end view, taken along lines 7-7 of FIG. 6, of the bearing of FIG. 6.

FIG. 8 is a sectional view of an intermediate part therefor, with pins thereof shown in side view.

FIGS. 9, 10, and 12 are sectional views of housing portions for the intermediate part.

FIG. 11 is an end view, taken along lines 11-11 of FIGS. 10 and 12, of the housing portion of FIG. 10, the similar end view of the housing portion of FIG. 12 being similar thereto.

FIGS. 13 and 14 are sectional views of offset shafts for the intermediate part.

FIG. 15 is a side view of a pin for the intermediate part.

FIG. 16 is a sectional view, taken along lines 16-16 of FIG. 13, of the shaft of FIG. 13.

FIG. 17 is a sectional view of a connector member for connecting the intermediate part in series to another intermediate part.

FIG. 18 is an end view, taken along lines 18-18 in FIG. 17, of the connector member.

DETAILED DESCRIPTION OF THE PREFERRED EMBODIMENT

Figure 1:
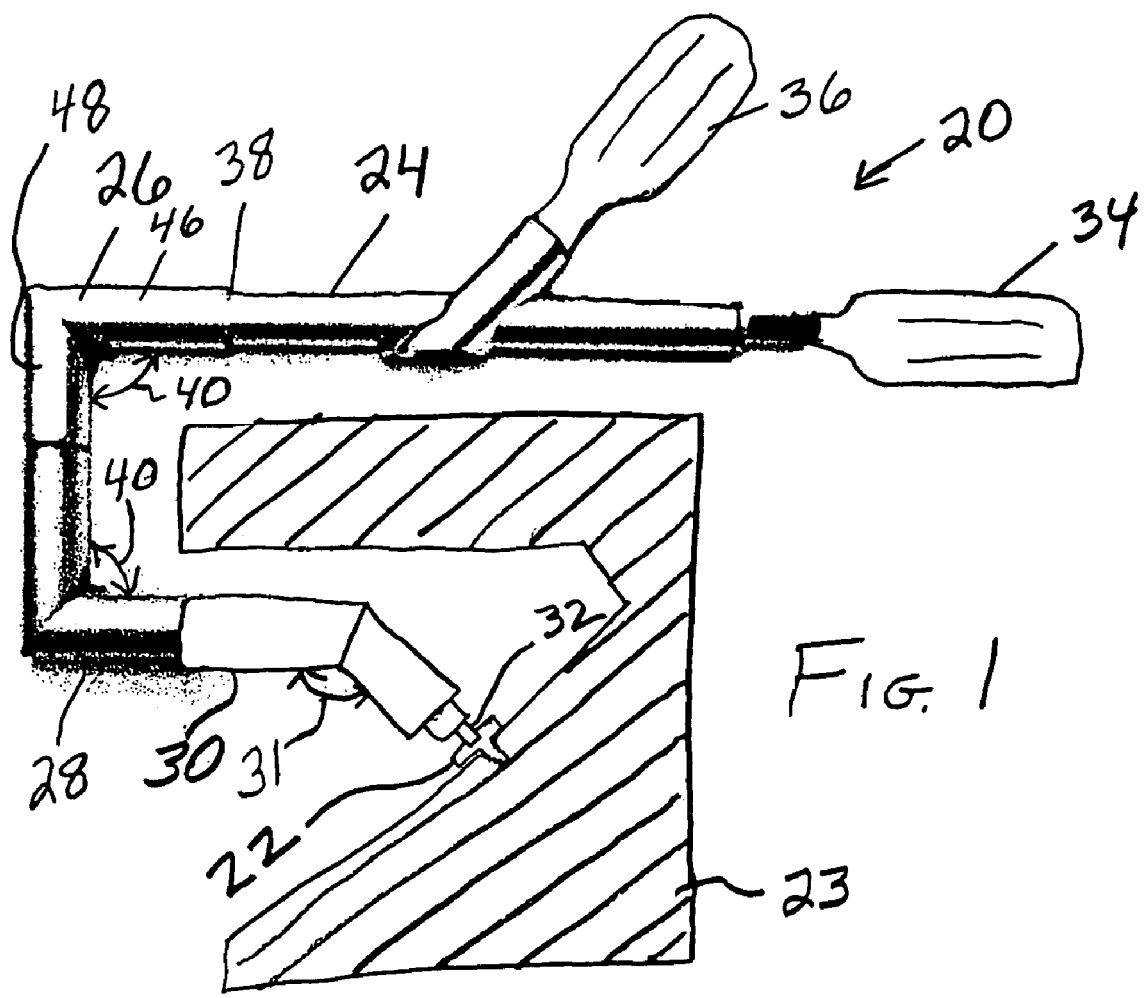
FIG. 1 is a perspective view of a tool which embodies the present invention.

Referring to FIG. 1, there is illustrated generally at 20 a tool for driving a fastener such as a nut or such as the screw illustrated at 22 into a workpiece 23. The tool 20 includes an input or driving part 24, a first intermediate part 26 detachably attached to the input part 24, a second intermediate part 28 detachably attached to the first intermediate part 26, and an output part 30 detachably attached to the second intermediate part 28 and terminating in a screwdriver blade 32 or other suitable fastener engagement means such as a socket for connecting to the screw 22 or other fastener for driving or loosening thereof. Alternatively, the driving part 24 may be connected directly to an output part 30 to form a complete system without any intermediate parts. Moreover, the intermediate parts 26 may allow attachment of output tools such as screwdriver bits or socket attachments. Thus, the driving part 24 may be connected in tandem with any combination of driven parts (intermediate and output parts) terminating in an output part. Thus, for the purposes of this specification and the claims, a "driven part" is defined as being either an intermediate or an output part. The tool 20 is provided with a suitable handle 34 for transmitting rotary motion to the blade 32 for turning thereof. The tool 20 may be provided with other suitable rotary motion transmitting means such as a wrench, power drive tool (power drill), or ratchet wrench. As apparent in FIG. 1, the tool 20 allows fasteners in hard-to-reach places or otherwise inaccessible places to be accessed. The tool 20 is also provided with a positioning handle 36 for use in holding the tool 20 in position and for applying pressure to the fastener 22 for driving or loosening thereof.

Figure 19:
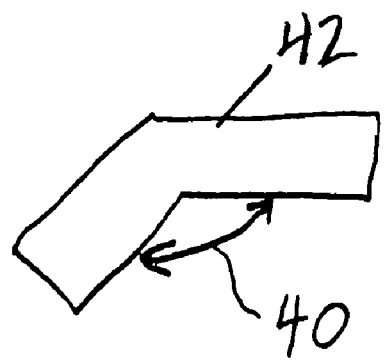
FIG. 19 is a schematic view of an alternative embodiment of an intermediate part.

The first intermediate part 26 is detachably attached to the input part 24 at 38 and is shown as elbow-shaped (angle 40 of 90 degrees) wherein it has two legs 46 and 48 to change the tool direction accordingly, i.e., the intermediate part 26 is offset. By "offset" of a part is meant, as used in this specification or in the claims, a bend or change of direction of the part which allows the direction to which rotary motion for turning a fastener is applied by a tool to be re-directed by the part to a different direction. Thus, it is a change of direction or offset of a tool part which causes the tool itself to be offset. The second intermediate part 28 is similarly elbow-shaped or offset to again change direction of rotary motion application to reach the fastener 22. It should be understood that only one intermediate part need be provided for the tool 20 or even none may be provided, or any number of intermediate parts may be provided and connected in tandem, depending on the location of the fastener 22 and the number of intermediate parts needed to access it. It should also be understood that, while an elbow shape is shown for each of the intermediate parts 26 and 28, the intermediate parts may have any number of shapes wherein the legs 46 and 48 form angles, illustrated at 40, within the range, as practical, of 0 to 180 degrees, for example, an angle 40 of 90 degrees for each of intermediate parts 26 and 28, as illustrated in FIG. 1, or, for another example, an angle 40 of 135 degrees for intermediate part 42 shown in FIG. 19, or, for other examples, angles of 30, 45, and 60 degrees. Thus, a kit of an input part 24 along with a variety of driven parts having various angles 40 or offsets may be provided so that one or more driven parts each appropriately shaped may be selected to achieve the needed access for a given task. One or more of the driven parts may be straight (i.e., angle 40 being 180 degrees) to provide length extension or extensions. In addition, the kit may also contain a number of output parts 30 for various functions such as screwdriver, socket wrenches of different sizes, etc. Moreover, the kit may contain input parts of different lengths.

Offset tools that have heretofore been provided have an offset input part which has a first leg to which the handle for turning a screwdriver blade or the like is attached and a second leg forming an angle with the first leg to provide the offset and to which an output part is attached. Such tools undesirably require the purchaser to purchase a separate tool (offset input part) for each of various offset angles which may be desired. In order to substantially reduce the resulting expense, in accordance with the present invention, the customer desirably need only purchase a single input part and a variety of less expensive offset driven parts.

Referring to FIGS. 2 to 7, the input or actionating part 24 includes a rotatable generally cylindrical shaft 50 having a cross-sectionally polygon-shaped (for example, hexagonal) end portion 52 to which a similarly shaped internal portion (not shown) of the handle 34 is connected. The end portion 52 has a ball detent 54 which is spring-loaded (by spring 56) to be engaged in a notch (not shown) in the handle internal portion for releasably holding the handle 34 on the shaft 50 in a manner commonly known in the art to which this invention pertains.

The shaft 50 is received within a tubular housing 58 which is closed at the handle and intermediate part ends by a pair of bearings 60 and 62 respectively for rotatably receiving the shaft 50. Where the term "tubular" or "cylindrical" is used in this specification and the claims, it is meant to include, as applicable, any other suitable shape, such as square, cylindrical, hexagonal, and octagonal. The bearings are suitably attached to the shaft such as by tapered press fits. Bearings 60 and 62 are partially received within the respective housing ends and are formed to have shoulders, illustrated at 64 and 66 respectively, on their radially outer surfaces to engage the respective ends of the housing 58 to fix their positions relative thereto. Bearing 60 has a bore 68 in which a reduced diameter portion 70 of the shaft 50 is bearingly rotatably received and defines a shoulder 72 which engages the radially inner end of the bearing 64 to fix its position axially relative thereto. A reduced diameter portion 74 of the shaft 50 is bearingly rotatably received in a bore 76 of the bearing 62 and defines a shoulder 78 which engages the radially inner end of the bearing 62 to fix its position axially relative thereto.

The bearing 62 has an increased diameter bore portion 80 defining the axially outwardly terminal end portion thereof. The outer surface of the bearing 62 from the shoulder 66 axially outwardly has a plurality of axially extending teeth 82 spaced circumferentially about the bearing surface for engaging the intermediate part 26 as discussed hereinafter.

Adjacent the reduced diameter shaft portion 74 is a further reduced diameter (diameter subtended when rotated) portion 84 which is polygon shaped in cross-section (similar in shape to that of portion 52) and with a circumferentially extending groove 86 therein for engaging the intermediate part 26 as discussed hereinafter.

The positioning handle 36 has a threaded end portion (not shown) which is threadedly received in a threaded bore, illustrated at 88, in an end of a generally cylindrical housing 90 which is suitably provided to extend at a suitable angle, illustrated at 92, for application of positioning force, for example, about 45 degrees. A bore, illustrated at 94, extends through the housing 90 in which the input part housing 58 is slidably received. An increased diameter bore, illustrated at 96, extends from bore 88 through the other end of the housing 90. A pressure member 98 is sized and shaped to be received in the bore 96 between the bore 88 and the input part housing 58 and flush with the cylindrical surface thereof to effectively transmit force from the handle 36 to the input part housing 58 to tightly secure the housing 90 to the input part housing 58 in accordance with principles commonly known to those of ordinary skill in the art to which this invention pertains.

Referring to FIGS. 8 to 18, the intermediate part 26 provides an offset corresponding to angle 40. By "offset" is meant, for the purposes of this specification and the claims, the re-direction or changing of the direction to which rotary motion is applied to drive (tighten, loosen, etc.) fasteners.

The offset intermediate part 26 comprises two cylindrical housing members 100 formed to have a pair of generally tubular legs 102 and 104 in which the angle there between corresponds to the angle 40, i.e., leg 104 is offset relative to leg 102, that is, leg 104 contains means (described hereinafter) for changing the direction to which rotation is applied to drive fasteners. In the special case where the angle 40 is 180 degrees for increasing the effective length of the tool 20 to extend the reach thereof, the member 100 would be tubular in shape (i.e., not having two offsetting legs).

A clip 106 has a pair of post portions 108 integrally or otherwise suitably attached to the legs 102 and 104 respectively and interconnected by bridging portion 110. The legs 102 and 104 are tightly or snugly received in generally tubular members 112 and 114 respectively to fix the cylindrical parts and provide increased rigidity, with each member 112 and 114 extending outwardly beyond the end of the respective leg. Each member 112 and 114 has a slot, illustrated at 116, having a width which is tapered and which is equal to approximately the diameter of the respective post 108. The clip 106 is received in the slots 116 to prevent rotational movement of the members 112 and 114, and the clip 106 is suitably longitudinally split so that the split portions must be squeezed together to be wedgedly received in the respective tapered slot so as to be tightly wedged in the slots 116 respectively so that members 112 and 114 are prevented from axial movement. Of course, other suitable means may be provided to prevent rotational and axial movement of the members 112 and 114.

Axially extending teeth 118 are formed internally of and circumferentially about the outer end portion 120 of member 112 which extends beyond the outer end of leg 102. These teeth 118 are complementary to teeth 82 on input part bearing 62 to mesh therewith for non-rotatably and detachably attaching bearing 62 and accordingly the input part housing 58 to the intermediate part member 112.

A pair of identical rotation transmission members 122 and 124 are rotatably but snugly received in the housing member legs 102 and 104 respectively. Each of the members 122 and 124 has a circumferential groove, illustrated at 126, intermediate the length thereof and dividing the member into a first portion 128 which is within the respective leg 102 and 104 and a second portion 130 which extends from the respective leg. The grooves 126 are engaged by circumferential ridges 132 on the inner surfaces of the legs 102 and 104 respectively on the terminal ends thereof to locate the members 122 and 124 axially and to prevent axial movement thereof. The ridges 132 are snap-fit or clicked into the grooves 126 respectively after which the members 112 and 114 are attached to fix the cylindrical parts and increase the rigidity so that the ridges 132 do not inadvertently release from the grooves 126 respectively.

Each rotation transmission member second portion 130 has a bore, illustrated at 134, therein. As discussed hereinafter, the bore 134 may alternatively be a female hex. A spring-loaded detent ball 136 (the spring is illustrated at 138 and is a non-continuous steel band which extends circumferentially all the way around the radially outer surface of the second portion 130) is suitably provided in the bore surface. By "non-continuous" is meant that the band 138 has two ends which may touch or have a gap therebetween.

The bore 134 in rotation transmission member 122 is provided for receiving input part shaft portion 84, with the shaft portion 84 detachably attached to the rotation transmission member 122 by the detent ball 136 thereof being received in the shaft portion groove 86, the shaft portion 84 being attachable and detachable by overcoming the force of spring 138. Thus, rotation of the rotation transmission member 122 is effected by the rotation of the shaft 50.

As previously pointed out, each rotation transmission member second portion 130 may instead of a bore 134 have a female hex therein and a groove to fix a ring. The female hex in rotation transmission member 122 is provided for receiving input part shaft portion 84, with the shaft portion 84 detachably attached to the rotation transmission member 122 by the ring thereof being received in the shaft portion groove 86, the shaft portion 84 being attachable and detachable by overcoming the force of the ring. Thus, rotation of the rotation transmission member 122 is effected by the rotation of the shaft 50.

Each rotation transmission member first portion 128 has three or more (for example, six) circumferentially spaced bores, illustrated at 140, in the adjacent terminal ends thereof. Three or more (for example, six) angular pins 142 are received in corresponding pairs of bores 140 respectively. Each pin 142 has a pair of legs 144 and 146 corresponding to housing legs 102 and 104 respectively and having the same angle 40 therebetween. Interference-preventing chamfers, illustrated at 148, are provided, as necessary, at the corners (intersections of the legs 144 and 146). One leg 144 is slidably and rotatably received in a bore 140 in rotation transmission member 122, and the other leg 146 is slidably and rotatably received in the corresponding bore 140 in the other rotation transmission member 124 for transmission of rotation from rotation transmission member 122 to rotation transmission member 124. Thus, during rotation through half a turn, the positions of the pins 142 as seen in FIG. 8 would interchange. Thus, the angular pins 142 without gearing or other rotation transmission means are provided to simplify the construction while providing reliable and rugged use, achieving high torque transmission for effective use, and minimizing space taken up by the tool 20 at the articulation point so that the tool may be more effectively and easily used in confined and hard-to-reach places.

Axially extending teeth, illustrated at 150, are formed internally of and circumferentially about the outer end portion of member 114 which extends beyond the outer end of leg 104. These teeth 150 are complementary to teeth 158 of member 152. In order to be able to detachably attach another intermediate part, such as part 28 in FIG. 1, to intermediate part 26, member 152 is provided with the axially extending teeth 158 circumferentially about the radially outer surface thereof for meshing engagement with teeth (similar to teeth 118) of the succeeding intermediate part (if such is added to the tool) so that rotation and axial movement does not occur. If such a succeeding intermediate part is added, then an interconnecting cylindrical or hexagonal member 160 is provided which has a pair of axially spaced circumferential grooves, illustrated at 162 and 164. The end portion 166 of the member 160 which contains groove 162 is received in the bore 134 or female hex of rotation transmission member 124 and detachably attached therein by snap-fitting or clicking of spring-loaded ball detent 136 or the previously discussed alternative spring-loaded ring into groove 162. The other end portion 168 of member 160 which contains groove 164 is received in the bore 134 or female hex of rotation transmission member 122 of the succeeding intermediate part 28 and detachably attached therein by snap-fitting or clicking of spring-loaded ball detent 136 or the previously discussed alternative spring-loaded ring into groove 162. It should be understood that other suitable attachment fittings may be provided.

It should be understood that the output part 30 may be similar to the intermediate part 26 with the exception that the second portion 130 of member 124 is suitably formed, in accordance with principles commonly known to those of ordinary skill in the art to which this invention pertains, to carry the screwdriver blade 32 (or other suitable tooling) such as, for example, by the tooling being integrally formed therewith. It should of course be understood that the output part 30 does not require the members 152 or 160. Alternative to being connected to one or more intermediate parts 26 the last one of which is connected to an output part 30, as illustrated in FIG. 1, the input part 24 may be connected directly to an output part 30 to provide a complete tool without intermediate parts.

Thus, there is provided a fastener driving tool which may inexpensively yet ruggedly and reliably utilize a universal input part and provide access to various hard-to-reach fasteners by the use for a given task of one or more of a number of driven (intermediate and output) parts providing various offsets, yet be able to transmit the torque loads necessary for tightening and loosening the fasteners and be streamlined (not too large or bulky) at the articulation point for effective use in difficult and confined places.

It should be understood that, while the present invention has been described in detail herein, the invention can be embodied otherwise without departing from the principles thereof, and such other embodiments are meant to come within the scope of the present invention as defined by the appended claims.

What is claimed is:

1. A fastener driving tool, comprising:
   an input part having an internal transmission member;
   a first offset driven part operatively arranged to be detachably attachable to said input part, said first offset driven part having an internal transmission member operatively arranged to be linked to and driven by said input part internal transmission member when said first offset driven part is attached to said input part; and,
   a second offset driven part operatively arranged to be detachably attachable to said first offset driven part, said second offset driven part having an internal transmission member operatively arranged to be linked to and driven by said first input part internal transmission member when said second offset driven part is attached to said first offset driven part;
   wherein said first offset driven part and said second offset driven part further comprises a plurality of pins rotatably connected between said rotation transmission member.

2. A fastener driving tool, comprising:
   an input part having an internal transmission member:
   a first offset driven part operatively arranged to be detachably attachable to said input part, said first offset driven part having an internal transmission member operatively arranged to be linked to and driven by said input part internal transmission member when said first offset driven part is attached to said input part;
   a second offset driven part operatively arranged to be detachably attachable to said first offset driven part, said second offset driven part having an internal transmission member operatively arranged to be linked to and driven by said first input part internal transmission member when said second offset driven part is attached to said first offset driven part; and,
   a detachably attachable slidable rotatable positioning handle wherein said positioning handle location is fixed by the application of a user controlled force.

3. The fastener driving tool according to claim 2, wherein said user controllable force is the axial displacement of a rotatable threaded rod.

* * * * *